United States Patent
Beuschel et al.

(10) Patent No.: US 11,453,316 B2
(45) Date of Patent: Sep. 27, 2022

(54) METHOD FOR OPERATING A VEHICLE, IN PARTICULAR A MOTOR CAR

(71) Applicant: Conti Temic Microelectronic GmbH, Nuremberg (DE)

(72) Inventors: Michael Beuschel, Stammham (DE); Berthold Bocsanyi, Altdorf (DE)

(73) Assignee: Conti Temic Microelectronic GmbH

( * ) Notice: Subject to any disclaimer, the term of this patent is extended or adjusted under 35 U.S.C. 154(b) by 838 days.

(21) Appl. No.: 16/338,510

(22) PCT Filed: Sep. 6, 2017

(86) PCT No.: PCT/EP2017/072302
§ 371 (c)(1),
(2) Date: Apr. 1, 2019

(87) PCT Pub. No.: WO2018/068950
PCT Pub. Date: Apr. 19, 2018

(65) Prior Publication Data
US 2020/0039395 A1    Feb. 6, 2020

(30) Foreign Application Priority Data
Oct. 12, 2016 (DE) ................... 10 2016 219 776.2

(51) Int. Cl.
*B60N 2/30* (2006.01)
*B60N 2/00* (2006.01)
(Continued)

(52) U.S. Cl.
CPC ............ *B60N 2/3011* (2013.01); *B60N 2/002* (2013.01); *B60N 2/0248* (2013.01); *B60N 2/66* (2013.01); *B60R 16/037* (2013.01); *G06F 3/048* (2013.01)

(58) Field of Classification Search
CPC .... B60N 2/3011; B60N 2/002; B60N 2/0248; B60N 2/66; B60N 2/0244; B60R 16/037; G06F 3/048
See application file for complete search history.

(56) References Cited

U.S. PATENT DOCUMENTS

| 5,243,267 A | 9/1993 | Ogasawara |
| 2012/0086249 A1* | 4/2012 | Hotary ..................... B60N 2/20 297/284.3 |

(Continued)

FOREIGN PATENT DOCUMENTS

| DE | 102011009331 A1 | 7/2012 |
| DE | 102014105422 A1 | 10/2014 |

(Continued)

OTHER PUBLICATIONS

German Examination Report for German Application No. 10 2016 219 776.2, dated Jul. 18, 2017—6 pages.

(Continued)

*Primary Examiner* — Richard M Camby
(74) *Attorney, Agent, or Firm* — RatnerPrestia

(57) ABSTRACT

A method for operating a vehicle including at least one device, in which the one device is altered from a first state to a second state by an electronic computing device of the vehicle. The electronic computing device ascertains a present time and automatically alters the device from the first state to the second state on the basis of the ascertained time. Provision is made for the second state to be ascertained automatically by the electronic computing device from the first state.

16 Claims, 1 Drawing Sheet

(51) Int. Cl.
  *B60N 2/02* (2006.01)
  *B60N 2/66* (2006.01)
  *B60R 16/037* (2006.01)
  *G06F 3/048* (2013.01)

(56) References Cited

U.S. PATENT DOCUMENTS

| | | | | |
|---|---|---|---|---|
| 2013/0062921 A1* | 3/2013 | Meyer | ............... | B60N 2/5685 |
| | | | | 297/354.1 |
| 2013/0218420 A1 | 8/2013 | Jendritza et al. | | |
| 2014/0217792 A1* | 8/2014 | Meyer | ............... | B60N 2/0244 |
| | | | | 297/354.1 |
| 2014/0310739 A1* | 10/2014 | Ricci | ............ | G06F 21/31 |
| | | | | 725/75 |
| 2014/0316660 A1 | 10/2014 | Le et al. | | |
| 2015/0203062 A1 | 7/2015 | Gautama et al. | | |
| 2015/0274100 A1 | 10/2015 | Kwak et al. | | |
| 2015/0353037 A1* | 12/2015 | Graham | ............... | B60R 16/037 |
| | | | | 701/49 |
| 2015/0353097 A1* | 12/2015 | Graham | ............... | B60R 16/037 |
| | | | | 701/48 |

FOREIGN PATENT DOCUMENTS

| | | |
|---|---|---|
| DE | 102013221650 A1 | 4/2015 |
| DE | 102014118115 A1 | 7/2015 |
| EP | 2481628 A1 | 8/2012 |

OTHER PUBLICATIONS

International Search Report and Written Opinion for International Application No. PCT/EP2017/072302, dated Dec. 7, 2017—7 pages.

* cited by examiner

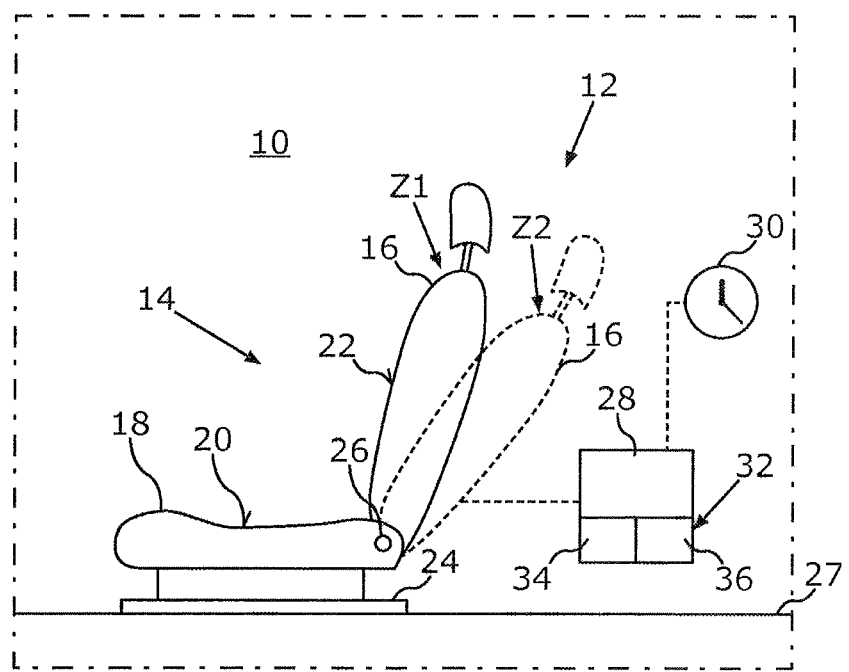

METHOD FOR OPERATING A VEHICLE, IN PARTICULAR A MOTOR CAR

CROSS REFERENCE TO RELATED APPLICATIONS

This application is the U.S. National Phase Application of PCT International Application No. PCT/EP2017/072302, filed Sep. 6, 2017, which claims priority to German Patent Application No. 10 2016 219 776.2, filed Oct. 12, 2016, the contents of such applications being incorporated by reference herein.

FIELD OF THE INVENTION

The invention relates to a method for operating a vehicle, in particular a motor car.

BACKGROUND OF THE INVENTION

Such methods for operating vehicles, in particular motor vehicles, for example in the form of motor cars, in particular in the form of passenger vehicles, are already sufficiently well known from the general prior art and in particular from large-scale vehicle construction. In this case, the respective vehicle comprises at least one device that can be altered or changed over between at least two different states, for example.

In this case, the device is for example a seat installation or the device comprises such a seat installation, with the alteration of the seat installation involving for example a position of the seat installation, in particular in the interior of the vehicle, and/or an outer contour of the seat installation being altered or adjusted. The position of the seat installation is also referred to as the seat position. The adjustment or alteration of the seat position involves for example the seat installation being moved in the vehicle longitudinal direction relative to a superstructure, in particular relative to the bodywork, of the vehicle and/or a backrest being altered, in particular pivoted, relative to a seat portion of the seat installation. Such adjustment of the seat position is realized for example by means of at least one electric motor.

The aforementioned outer contour is also referred to as the seat contour, the seat contour having for example a seat provided by the seat installation. This seat can be sat in by a seat occupant. The alteration of the seat installation from a first of the states to the second state involves for example the seat contour being changed, so that for example the seat occupant can adjust the seat contour according to need. In particular, the seat occupant can adjust a lumbar support and/or at least one side piece of the seat installation when altering the seat contour.

The aforementioned method involves the device being altered from the first state to the second state by means of an electronic computing device of the vehicle. To this end, the electronic computing device actuates for example at least one actuator by means of which the device is altered. If the device is for example initially set to the first state, and if for example the second state is stored in a memory device, in particular in an electronic computing device, and if for example a person then operates at least one operator control element of the vehicle so as thereby to retrieve the second state from the memory device, then for example the operation of the operator control element caused by the person results in the device being altered from the first state to the stored second state by means of the electronic computing device.

SUMMARY OF THE INVENTION

An aspect of the present invention aims to develop a method of the type cited at the outset further such that a particularly high level of travel comfort can be provided.

In order to develop a method of the type specified in the preamble of patent claim 1 further such that a particularly high level of comfort, in particular a particularly high level of travel comfort, can be provided, there is provision, according to an aspect of the invention, for the electronic computing device to ascertain a present time and to automatically alter the device from the first state to the second state on the basis of the ascertained time. By way of example, the second state is stored in a memory device, in particular the electronic computing device. In other words, for example data characterizing the second state are stored in the memory device. On the basis of the present ascertained time and for example on the basis of the present hour of the day, the stored second state or the data characterizing the second state is/are retrieved from the memory device, so that the device is then automatically altered from the first state to the second state by means of the electronic computing device on the basis of the present ascertained time. This means that the second state of the device is selected by means of the electronic computing device on the basis of the present ascertained time without any action by a person such as for example the driver of the vehicle.

In this case, an aspect of the invention is based in particular on the insight that, in modern means of transport, devices are increasingly being used that can be used and in particular altered between at least two different states by users, in particular occupants, of the vehicle, for example. One such device comprises for example a seat installation providing at least one seat for an occupant of the vehicle. The seat installation is for example a bench seat or else a single seat. In this case, the seat installation is for example in the form of an electrically adjustable seat installation, the position or orientation of which in the interior of the vehicle is adjustable, in particular by means of at least one electric motor. Alternatively or additionally, the seat installation has for example an adjustable or alterable seat contour forming or having at least the aforementioned seat. By adjusting the position or orientation and/or the seat contour, for example an occupant of the seat installation can adjust the orientation and outer contour thereof according to need.

Alternatively or additionally, the device can comprise a steering handle, for example in the form of a steering wheel and for example comprising a steering column, and/or at least one rearview mirror. The alteration of the steering handle or of the rearview mirror involves for example the steering handle or the rearview mirror being moved from a first position to a, by contrast, different second position, in particular relative to the superstructure of the vehicle. This movement is caused for example by means of at least one electric motor. The steering handle is for example a steering wheel of the vehicle.

Further, equipment variants having what is known as a memory function are known. The memory function can be used to store at least one state, in particular the second state, of the device. In particular, for example the second state is stored electronically. The stored state is for example assigned to a memory location in the memory device, a key of the vehicle and/or a user or driver identification. As a result, for example respective different states or configurations can be stored and retrieved. If for example the vehicle is unlocked using a key, then for example that state of the device that is assigned to this key is retrieved from the memory and selected. Alternatively or additionally, it is conceivable to retrieve and select the respective stored state on a change of driver or at the request of a user. The aforementioned request is made for example by virtue of a user or a person operating and thereby using at least one operator control element of the vehicle. If such operation of the operator control element caused by a person is detected, then for example the stored state assigned to the operator control element is retrieved and selected.

Further, an aspect of the invention is based on the insight that a large number of activities are accomplished while sitting or without sufficient physical movement of people. As a result, for example over the course of the day, physiological changes to the human body arise, which means that for example compression of the disc as a result of the body weight and/or a change in the spine/lordosis arises. In particular, the healthy natural curvature of the lumbar spine in the direction of the stomach changes to a rearwardly directed bulge as the muscles tire, and these changes normally disappear again only in the course of a nocturnal sleep phase.

Against this background, it has been found that for example a state of a device of a vehicle that is advantageous for producing advantageous ergonomics can change depending on the time or hour of the day. As such, for example the ergonomically optimum adjustment of a driver's workspace or of a seat installation in the vehicle can differ for one and the same person depending on the time or hour of the day. On the basis of experience, however, only very few users change the settings for seats, steering column, steering handle and mirrors during a journey. Consequently, the setting actually used, that is to say the present state of the device of the vehicle, is for the most part less than optimum and an initially advantageous and ergonomically beneficial state of the device becomes disadvantageous over the course of the day on account of the physical changes described above.

It has thus been deemed advantageous to track the state of the device to the advancing time or hour of the day and hence, according to an aspect of the invention, to change the state of the device automatically on the basis of the time and in so doing to alter the device from the first state to the second state, so that a particularly advantageous level of comfort, in particular travel comfort and/or use comfort, can be provided for at least one person using the vehicle and in particular occupying the interior of the vehicle during a journey. Since the method according to an aspect of the invention involves the device being altered and hence adjusted automatically on the basis of the time or hour of the day, daytime changes in human physiology can be taken into consideration in order to provide a particularly high level of travel comfort. As well as that, the method according to an aspect of the invention allows at least semiautomatic adaptation to changing users of the vehicle, as will be explained more precisely below.

In an advantageous refinement of an aspect of the invention, before the device is automatically altered, a state of the device that a person has selected is stored, in particular in the aforementioned memory device, which for example can be in the form of an electronic memory device and/or can be part of the electronic computing device or of the vehicle. Further, before the device is automatically altered, a time at which the state selected by the person is stored is ascertained, wherein the ascertained time at which the state selected by the person is stored is assigned to the stored state. Additionally, before the device is automatically altered, the assigned time is stored. In addition, on the basis of the assigned, stored time and on the basis of the ascertained, present time, the stored state is used as the second state, wherein the device is automatically altered from the first state to the stored, that is to say second, state by means of the electronic computing device. This means that the stored state is the second state. In this embodiment, there is therefore provision for a memory function. The memory function involves the state selected by the person being stored, wherein the storing results in the time or hour of the day being taken into consideration.

The automatic alteration of the device caused by means of the electronic computing device then involves for example the stored state being retrieved from the memory device and used as the second state, wherein the automatic altering of the device also results in the time or the hour of the day being taken into consideration. The stored or second state is therefore for example a memory state that is selected automatically on the basis of the present, ascertained time by means of the electronic computing device. Hence, there is for example the possibility of adjusting a setting or configuration that is particularly advantageous, in particular ergonomic and comfortable, for the person automatically in the course of the automatic selection of the second state, so that a particularly high level of comfort can be provided.

In order to produce a particularly agreeable and comfortable alteration, a further embodiment of the invention has provision for the ascertained, present time to be compared with the assigned, stored time, wherein, on the basis of the comparison, the stored state is used as the second state and the device is automatically altered from the first state to the stored state by means of the electronic computing device.

It has further been found to be particularly advantageous if the device is automatically altered from the first state to the stored state (to the second state) by means of the electronic computing device if the ascertained, present time corresponds to the assigned stored time. By linking the time to the stored state, it is possible to ascertain or detect that the stored state is a particularly advantageous and for example ergonomically beneficial and comfortable state of the device at the time assigned to the stored state. This link is used to select the particularly comfortable or ergonomically beneficial second state when the ascertained, present time corresponds to the assigned, stored time, so that the person can be provided with a particularly high level of comfort.

It has been found to be furthermore particularly advantageous if the device is automatically altered from the first state to the stored state by means of the electronic computing device if the ascertained, present time is within a time interval ascertained on the basis of the assigned, stored time. The time interval is also referred to as a time period. From the assigned, stored time, it is therefore possible to ascertain a time period during which the second state, in particular against the background of the time-dependent physiological change in the human body described above, is particularly advantageous and comfortable. This allows a particularly high level of comfort to be provided.

According to an aspect of the invention, the second state is ascertained, that is to say calculated, automatically by means of the electronic computing device from the first state on the basis of the ascertained, present time. This means that, for example if the second state has not been prescribed by the person and has not been stored, calculation is automatically performed by means of the computing device, for example taking into consideration the daytime physiological changes in the human body described above, so as thereby to provide a particularly high level of comfort. The calculation of the second state is based on the first state in this case. From the first state, an adequate difference between the first and the second state is ascertained, so that the second state is particularly comfortable for the person.

This difference is also referred to as an offset, which means that this embodiment of the invention has provision for the first state to have an, in particular time- or time-of-day dependent, offset applied to it so as thereby to ascertain the second state. In particular, it is conceivable that the second state is ascertained or calculated from the first state by means of an interpolation.

In order to be particularly well able to take into consideration the physiological change in the body that advances as the time or hour of the day advances, a further embodiment of the invention has provision for the second state to be ascertained, in particular calculated, automatically by means of the electronic computing device from the first state on the basis of the ascertained, present time.

To provide a particularly high level of comfort, in particular a particularly high level of travel comfort, a further embodiment of the invention has provision for the device to be automatically altered from the first state to the second state by means of the electronic computing device during a journey by the motor vehicle. In particular, the device is automatically altered from the first state to the second state by means of the electronic computing device during a journey by the motor vehicle if a length of time for the journey exceeds a prescribeable or prescribed threshold value. The first state is for example a first configuration of the device, the second state being for example a second configuration of the device. The first state and the second state or the first configuration and the second configuration are used as related configurations, wherein for example the automatic alteration of the device involves a transition from the first configuration to the second configuration being effected that is at least almost unnoticeable to the person.

As a result, there is for example the possibility, during longer journeys, of producing an at least almost unnoticeable transition from the first configuration to the second configuration, which is related to the first configuration, so that a particularly high level of comfort can be provided without the need for action by the person.

It has been found to be particularly advantageous if the first state used is a state of the device that is selected and stored by a person. Hence, the first state is a memory state, which means that for example not only the second state but also the first state is a respective memory state. Above that, for example the aforementioned memory function is used to store the first state, in particular in the memory device. In this case, for example the first state is referred to as the first memory state and the second state is referred to as the second memory state. Preferably, there is provision in this case for the memory states, which form the aforementioned, related configurations, for example, to be assigned to a common assignment element.

The assignment element is for example a memory location, a key of the vehicle or a driver identification. If for example the vehicle is used, in particular unlocked, by means of a key, then the memory function assigned to this key is resorted to. In this case, for example initially the first memory state assigned to the key is retrieved from the memory device and selected, so that the first state of the device is selected, in particular before the beginning of a journey. At a later time, the second memory state, which is related or linked to the first memory state and assigned to the key, is then selected in the manner described, so that in this case the device is automatically altered to the second state by means of the electronic computing device.

If, for example at a later time, the vehicle is used, in particular unlocked, by means of a second key that is different than the aforementioned key, and if the second key has further assigned memory states that are different than the aforementioned memory states, then these further memory states assigned to the second key are resorted to in the manner described above in connection with the first memory state and the second memory state.

The same applies, mutatis mutandis, to different memory locations or memory areas. If for example a first operator control element of the vehicle that is assigned to a first of the memory locations is operated, then the first memory state and the second memory state are then used in the manner described above, since the first and second memory states are assigned to the first operator control element and the first memory location and in particular stored in the first memory location. If, however, for example a second operator control element assigned to the second of the memory locations is operated, then the further memory states stored in the second memory location are used and accordingly selected. This principle can further be transferred to a driver identification. If for example the driver identification involves a first driver being ascertained, then the first memory state and the second memory state are used in the manner described above. If, however, the driver identification involves a second driver, different than the first driver, being ascertained, then the further memory states are used and selected.

It is therefore possible for the method according to an aspect of the invention to involve not only the time or hour of the day being taken into consideration, but also different people using the vehicle being taken into consideration, so that particularly simple, automatic and comfortable adaptation to changing people and hence users of the vehicle is realizable. As a result, a particularly high level of comfort, in particular travel comfort and use comfort, can be provided for the respective user.

In a particularly advantageous refinement of an aspect of the invention, after the end of a journey and before the start of a journey following the end of the journey for the vehicle, the stored first state is selected automatically by means of the electronic computing device. As a result, for example a user to whom for example the first state is assigned can be provided with a particularly high level of comfort right at the start of the journey.

In a further particularly advantageous embodiment of the invention, the first state and/or the second state is/are assigned to a user. The electronic computing device is used to select the respective state of the device that is assigned to the user if it is detected that the user uses the vehicle and/or approaches the vehicle. This allows a particularly high level of travel comfort to be provided for the user without the need for action by the user.

The user is for example what is known as a primary user who predominantly uses the vehicle on his own or in comparison with at least one further user, who is also referred to as a secondary user. As a result, the primary user can be provided with a particularly high level of comfort.

It has been found to be particularly advantageous if the electronic computing device is used to detect a number of adjustment processes in which the device is repeatedly altered by a person from respective states to the same state or to a range of states of the device that comprises multiple states. If the number of adjustment processes exceeds a threshold value, the state to which the device is set in the adjustment processes is used as the first or second state or a state from the range of states is used as the first or second state.

This allows for example the primary user to be altered or changed in a particularly simple and comfortable manner. If the vehicle is for example initially used by a first primary user, then, in particular automatically, the first and/or second state assigned to the primary user is selected automatically. If the vehicle is in this case also used by a secondary or other user, who is different than the primary user, then the secondary user needs to alter the device in order to adapt the device to his needs.

Hence, the other user performs an adjustment process in order to adapt the device, which was previously automatically adapted to the primary user, to his own needs.

If it is then for example detected that the other user performs adjustment processes so often that the number of adjustment processes exceeds the for example prescribed or prescribeable threshold value, then it is assumed that the other user is becoming a new primary user of the vehicle, replacing the first primary user. The state selected by the new primary user in the course of the respective adjustment process is then used as the first or second state and assigned to the new primary user, so that the vehicle is then adapted no longer to the first primary user but rather to the new primary user automatically. This allows a particularly high level of comfort to be provided. The change of primary user described above can in this case be transferred to the first state and alternatively or additionally to the second state.

Hence, there is for example provision for a constant or changing user, in particular primary user, to be ascertained from a history of manually made settings for the device and, as a result, for a probable setting for the device or for the driver's workspace to be anticipated.

In a further refinement of an aspect of the invention, there is provision for the electronic computing device to ascertain a present date and to automatically alter the device from the first state to the second state on the basis of the ascertained date. Hence, not only the time or hour of the day but also the date is taken into consideration, which means that for example days of the week, holidays and/or other events on the calendar can be taken into consideration. In this case, for example multiple states and configurations are stored together with information about the associated time or hour of the day or about the day of the week for the setting. In every new travel cycle, the most probable configuration is then ascertained from these data and used for automatic pre-adjustment, so that the device already has the first state before the start of the journey, for example.

The method according to an aspect of the invention is particularly advantageous for seat installations, which means that the altering of the device results in at least one seat installation of the vehicle being altered, for example. Alternatively or additionally, the method can comprise non-geometric comfort settings. In this case, there is for example provision for the altering of the device to result in a reproduction unit, designed for outputting sounds and/or images, and/or a telephone unit, designed for conducting telephone calls, and/or an air-conditioning device, designed for air-conditioning the interior, and/or at least one rearview mirror and/or at least one steering handle, in particular a steering wheel, of the vehicle being altered.

The respective state is for example a radio station, which means that the automatic alteration results in for example a first radio station being changed over to a second radio station. Further, the respective state can be a style of music and/or a volume at which, in particular in the interior of the vehicle, sounds or music is reproduced. Further, the respective state can be a tone setting or multiple tone settings. Alternatively or additionally, the respective state can comprise telephone settings, temperature settings, ventilation settings and/or air-conditioning settings.

Advantageous refinements of aspects of the invention can, where applicable to the adjustable device, also be regarded as advantageous refinements of the device, and vice versa.

According to a further aspect of the invention, an adjustable device having an electronic computing device is provided that is designed to perform a method according to the depiction above or a refinement thereof.

BRIEF DESCRIPTION OF THE DRAWINGS

Further advantages, features and details of aspects of the invention are obtained from the description of a preferred exemplary embodiment below and from the drawing. The features and combinations of features cited in the description above and the features and combinations of features cited in the description of the FIGURE below and/or in the single FIGURE alone are usable not only in the respectively indicated combination but also in other combinations or on their own without departing from the scope of aspects of the invention. The single FIGURE of the drawing shows a detail from a schematic side view of an interior of a vehicle, with a device that is automatically altered from a first state to a second state by means of an electronic computing device on the basis of an ascertained present time.

DETAILED DESCRIPTION OF THE PREFERRED EMBODIMENTS

The single FIGURE shows a detail from a schematic side view of an interior 10 of a vehicle in the form of a motor car, in particular in the form of a passenger vehicle. The vehicle comprises at least one device 12, arranged in the interior 10, that is in the form of a seat installation of the vehicle or comprises at least one seat installation. In the present case, the seat installation is in the form of a vehicle seat or single seat and has precisely one seat 14 for an occupant of the vehicle. The text below refers to the FIGURE to describe a method for operating the vehicle, the explanations below and above being able to be transferred not only to the seat installation but also to other, adjustable devices of the vehicle.

It can be seen from the FIGURE that the device 12, which is in the form of a seat installation in the present case, has a backrest 16 and a seat portion 18, wherein the seat portion 18 has a seat area 20 and the backrest 16 has a backrest area 22. The aforementioned occupant can sit on the seat area 20 and lean against the backrest area 22 in this case.

The seat installation is held on a floor 27 of the vehicle by means of seat rails, of which the left-hand seat rail, denoted by 24, in relation to the forward direction of travel can be seen in the FIGURE, the floor 27 being part of a superstructure, in particular of the bodywork, of the vehicle, for example. In this case, the seat installation is movable along the seat rails and, in the process, translationally relative to the floor 27 in the vehicle longitudinal direction, so that the seat installation can be moved to different positions. In this case, there is for example provision for an electric motor, not depicted in more detail in the FIGURE, by means of which the seat installation can be moved translationally along the seat rails.

As well as that, the backrest 16 is pivotable relative to the seat portion 18 about a pivot axis 26, the pivot axis 26 running in the vehicle transverse direction, for example. As a result, the backrest 16 can be pivoted relative to the seat portion 18 between a first position, illustrated by solid lines in the FIGURE, and at least one second position, illustrated by dashed lines in the FIGURE, the first position being a first state Z1 and the second position being a second state Z2 of the device 12. In other words, the backrest 16 assumes the first position in the first state Z1 and the second position in the second state Z2.

By way of example, there is provision for at least one electric motor by means of which the backrest 16 can be pivoted between the positions, so that the different states Z1 and Z2 are adjustable by means of the electric motor and hence electrically. In this case, the vehicle further comprises an electronic computing device 28, also referred to as a controller. The electrical computing device 28 is designed to actuate the electric motor so as thereby to operate the electric motor and, as a result, to pivot the backrest 16 relative to the seat portion 18.

As will be explained more precisely below, the aforementioned method has provision for the device 12 to be altered from the first state Z1 to the second state Z2 by means of the electronic computing device 28 and in the present case by means of the electric motor.

The seat installation is for example the driver's seat, in which the driver of the vehicle can sit. The driver's seat is in this case for example assigned to what is known as a driver's workspace, which can have further assigned devices alterable between at least two different states. These further devices are for example movable and hence alterable rearview mirrors and/or a steering handle, for example in the form of a steering wheel, that can be moved and hence altered between at least two different positions and hence states relative to the superstructure of the vehicle. Further, the further devices can be an air-conditioning device and/or a reproduction unit for reproducing sounds and music.

So as now to provide a particularly high level of comfort, in particular a high level of travel comfort and use comfort, the aforementioned method has provision for the electronic computing device 28 to ascertain a present time. To ascertain the present time, there is for example provision for a timer 30, which is also referred to as a clock. The clock is for example a component of the vehicle or else a component external to the vehicle. The timer 30 provides at least one time signal, characterizing the present time on the timer 30, that is transmitted to the electronic computing device 28 (controller) and received by the controller. In particular, it is conceivable that the timer 30 is part of the controller. On the basis of the time signal and hence on the basis of the present time on the timer 30, the electronic computing device 28, in particular the electric motor, is used to automatically alter the device 12 from the first state Z1 to the second state Z2.

The first state Z1 is for example a first memory state stored in an electronic memory device 32 of the controller. To this end, the controller has a first memory location 34, which is a first memory area, for example. In this case, the first memory state is stored in the first memory location 34. In other words, for example first data characterizing the first memory state or the first state Z1 are stored in the first memory location 34 or in the first memory area. In particular, the first state Z1 is a state selected by a person, in particular by the driver of the vehicle, that is stored in the memory location 34.

Preferably, the second state Z2 is a second memory state stored in the memory device 32, in particular in a second memory location 36 of the memory device 32. The second memory location 36 is for example a second memory area storing the second memory state or second data characterizing the second memory state and hence the second state Z2.

By way of example, the first memory state has an assigned first time or first time interval, wherein alternatively or additionally the second memory state has an assigned second time, which is different than the first time, or a second time interval, which is different than the first time interval. Further, for example the first time or the first time interval is stored in the first memory area and the second time or the second time interval is stored in the second memory area. Hence, if for example the ascertained present time corresponds to the second time or if the present, ascertained time is within the second time interval, then device 12 is automatically altered from the first state Z1 to the second state Z2 by means of the electronic computing device 28. If for example the present, ascertained time subsequently corresponds to the first time or if the ascertained, present time is within the first time interval, then the device 12 is automatically altered from the second state Z2 to the first state Z1 by means of the electronic computing device 28. This time-dependent, in particular time-of-day-dependent, alteration of the device 12 can readily be performed with a larger number of states of the device 12 than two and/or with a larger number of times than two.

The first state Z1 is for example a state selected manually by the aforementioned person and stored in the memory device 32, wherein the first time is for example the time at which the selected state was stored. Alternatively or additionally, for example the second state Z2 is a state selected manually by the person that is or has been stored in the memory device 32 at the second time. The respective memory location 34 or 36 is in this case an assignment element to which the first state Z1 and the associated first time or the second state Z2 and the associated second time are assigned. Alternatively or additionally, the assignment element used can be a key by means of which the vehicle is used, in particular unlocked, by a person, for example. If there is for example provision for two different keys, then for example a first of the keys has the aforementioned memory states and the associated times assigned to it.

A second of the keys has for example further memory states of the device 12 and associated further times assigned to and possibly stored for it. If it is therefore for example detected that the vehicle is used by means of the first key, then for example the memory states assigned to the first key are retrieved and automatically selected by means of the electronic computing device 28. If, however, by contrast, it is for example detected that the vehicle is used by means of the second key, then for example the further memory states assigned to the second key are retrieved and selected by means of the electronic computing device 28.

This can also be transferred to a driver identification, which means that for example if it is detected that a first user approaches the vehicle or uses the vehicle and in so doing occupies the vehicle, for example, the aforementioned first memory states are retrieved and selected. If, however, it is for example detected that a second user, different than the first user, uses the vehicle or occupies the interior 10 or approaches the vehicle, then the electronic computing device 28 is then used to retrieve and automatically select the further memory states.

The respective memory states, that is to say for example the first memory state and the second memory state (first state Z1 and second state Z2), form related configurations that are stored in the memory device 32 and between which the device 12 is changed over or altered.

The assignment of the respective configuration or of the respective state Z1 or Z2 can be effected in the following manner, for example: In particular, it is possible to split the day into fixed sections, in particular time periods. In the example below, there is provision for three time periods A, B and C into which the day is split. The first time period A extends for example from 0:00 to 6:00, the second time period B extends for example from 6:00 to 15:00 and the third time period C extends for example from 15:00 to 24:00 or 0:00.

Alternatively or additionally, for example the time periods, time limits and/or the number of for example stored time periods are adapted automatically according to the most frequent use in order to map a temporal user profile as efficiently as possible. In particular, times of frequent use can be clustered or grouped into a respective range, additional clusters or groupings being able to be produced upward of a defined frequency within the respective range. If for example a person now regularly uses, in particular starts, the vehicle at 8:00, at 16:00 and at 21:00, then the time periods are shifted accordingly and centered around these times. If for example the driver additionally often also drives at 10:00, then an additional time period is produced at that point and if need be is pre-allocated states of the device 12 that have been calculated for this time hitherto.

To store and retrieve and also select the respective related configuration, the following options can be used: By way of example, precisely the relevant time period is stored or read, that is to say retrieved, in each case. Further, it is conceivable to also evaluate or change adjacent time periods. In particular, for an interpolation, this is effected with all the higher weighting the closer the adjacent time period is to the present time. This allows gradual transitions between the related configurations, that is to say between the states Z1 and Z2. As such, for example storage of a state of the device 12 at 16:00 results in the time period C being overwritten, but the time period B is also changed to a smaller extent in the same direction.

In other words, if for example the person selects a third, new state, different than the states Z1 and Z2, during the second time interval, and if the person stores this third state in the memory device 32 during the second time interval or if the third state is automatically stored in the memory device 32 by means of the electronic computing device 28 during the second time interval, then the second state Z2 initially assigned to the second time interval is overwritten by the new state and replaced, so that for example the third state Z3 then becomes the new state Z2. In this case, it is conceivable to leave the first state Z1 associated with the original second state Z2 unchanged, or else the first state Z1, which formed a related configuration with the original state Z2 and now forms a related configuration with the new state Z2, is preferably changed slightly and brought more into line with the new state Z2, so that for example the automatic alteration of the device 12 from the new state Z2 to the adapted state Z1 or vice versa then results in a particularly agreeable and at least almost unnoticeable transition being able to be produced. The same can be effected, mutatis mutandis, if the person changes and stores the state Z1 during the first time interval.

The aforementioned interpolation is performed for example only if the adjacent time periods or time intervals do not differ too greatly. Otherwise, the time periods are handled as separate sections again, which means that no reciprocal influencing of the time periods or of the states associated with the time periods is effected. This covers in particular the case in which the same vehicle is regularly used by multiple people at respective different times of day.

Further, it has been found to be advantageous if, when a state is stored for the first time, it is adopted for the applicable time period directly. For the other time periods, for example a respective state is stored with, and hence pre-allocated, applicable time-of-day-dependent differences, what are known as offsets. If for example initially the second state Z2 is not stored by a person, then it is conceivable that the second state Z2 is ascertained, in particular calculated, automatically by means of the electronic computing device 28 from the first state Z1, in particular on the basis of the ascertained, present time. In this case, the first state Z1 has a difference applied to it, which is also referred to as an offset. The second state Z2 thus transmitted is then for example stored in the memory device 32 and in particular retained until the second state Z2 transmitted in the manner described is for example overwritten with a state of the device 12 that is selected manually by the person.

The difference in regard to the calculating of the second state Z2 from the first state Z1 arises for example from medical data pertaining to the typical change in the human physical constitution across the time or hour of the day, that is to say for example lowering the mirror position as the hour of the day progresses or extending a lumbar support more in the afternoon in order to compensate for the waning muscle tension. As soon as the person stores a state or a position of the seat installation, for example including at another hour of the day, or corrects the automatically selected state, the corrected state is adopted for this time period directly and used instead of the previous pre-allocation or instead of the state calculated on the basis of the difference.

If the driver travels for a longer time, that is to say over several of the stored time periods, then the state and hence the configuration of the device 12 are altered, preferably in multiple unnoticeable steps, to the state stored or interpolated for the respective present time. In other words, there is preferably provision for the device 12 to be automatically altered from the first state Z1 to the second state Z2 by means of the electronic computing device 28 during a journey, in particular if a length of time for the journey exceeds a prescribed or prescribable threshold value. Alternatively, the automatic altering of the device 12 is effected only during a stop or while the vehicle is at a standstill, for example during interim alighting or boarding, when switching off the engine or when a door of the vehicle is being opened.

The time or hour of the day is preferably transmitted to and received by the controller from a central clock of the vehicle via a communication interface following activation of the controller, which means that the timer 30 can be said central clock.

It has been found to be particularly advantageous if automatic pre-adjustment of the device 12 is effected, the automatic pre-adjustment corresponding to the probable use so as thereby to relieve the user of the burden of frequent manual alteration.

To this end, for example initially, after every manual change made, the new configuration, that is to say the new state, is stored and if need be automatically selected again before the next journey begins. Preferably, the adjustment is effected as soon as the vehicle detects that the respective user approaches the vehicle, opens or unlocks it and/or opens the door. As a result, the adjustment is effected at least largely unnoticed by the user and in the unmanned vehicle.

In other words, there is preferably provision for after the end of a journey and before the start of a journey following the end of the journey, the stored first state Z1 to be selected automatically by means of the electronic computing device 28, in particular if it is detected that a respective user uses the vehicle and/or approaches the vehicle.

In a further refinement, the stored configuration can be used as a reference for comparing whether there is a change of what is known as a primary user of the vehicle. Only if a configuration changed by a different user is manually selected repeatedly and in a similar manner, a change of primary user is detected and the new configuration is adopted. Repeated use is for example threefold manual adjustment or adjustment on three journeys or three activations of the vehicle or parking maneuvres. Therefore, there is for example provision for the electronic computing device 28 to be used to detect a number of adjustment processes for which the device 12 is repeatedly altered by a person from respective states to the same state or to a range of states of the device 12 that comprises multiple states.

If the number of adjustment processes exceeds a threshold value, the state to which the device 12 is set in the adjustment processes is used as the first or second state Z1 or Z2 or a state from the range of states is used as the first or second state Z1 or Z2. The threshold value is three, for example. On occasional use of the vehicle by someone else, the original stored configuration, that is to say for example initially the first state Z1 and, on the basis of the time, the second state Z2, is therefore always initially selected, which means that the selected configuration needs to be corrected by a secondary user, who is different than the primary user. In this case, the original configuration can be started up or selected, for example even a prescribeable period of time of for example five minutes after the vehicle is switched off or when locking the vehicle or when logging out of an identification device for identifying the respective key, in order to adjust the vehicle in optimum fashion for the primary user before his journey begins. Therefore, the original configuration is restored without the primary user being aware, and is also not a risk as a result of possible unintentional alteration for the primary user.

If, however, it is for example detected that the number of adjustment processes caused by a user who is different than the primary user exceeds the threshold value, then the user who is different than the primary user becomes the new primary user of the vehicle, replacing the previous primary user. The states of the device 12 that are selected manually by the new primary user are then automatically used as the states Z1 and Z2 and accordingly selected automatically.

The detection of a new primary user can be made dependent on whether the new configuration, that is to say the states selected by the new primary user, differs significantly in at least one feature or positioning from the configuration used by the previous primary user. For minor changes, the configuration can continue to be adopted immediately, since it can be assumed that the primary user requires a slight correction. The method can be effected separately for multiple, different keys of the vehicle, which means that there is provision for one primary user per key, for example. The respective configuration can be changed at any time by the respective user in the customary manner and also deliberately stored directly as a new configuration so as to anticipate the automatic detection.

In a further embodiment, different configurations can also be evaluated on the basis of the hour of the day and possibly on the day of the week, including holidays, and calendar. In this case, multiple configurations are stored together with information about the associated hour of the day or the day of the week for the respective setting. Whenever a new journey begins, the most probable configuration is then transmitted from these data and used for automatic pre-adjustment.

The method described above has in particular the following advantages: unnoticeable and automatic adjustment of the device 12 and hence of the driver's workspace even with minimal assistance by the user of the vehicle; automated comfort position without any necessary alteration or activity by the user, since comfort settings become available in automated fashion right at the beginning of every journey by the primary user; unnoticeable and automatic pre-adjustment of an ergonomically good driver's workspace even when vehicle users change; individual and intuitively adaptable function; use of existing hardware, that is to say of existing components, which means that the method is realizable particularly inexpensively; gain in comfort for the primary user possible even in the case of simple vehicle versions, since the method can be realized even without additional operator control functions such as switches and menus.

LIST OF REFERENCE SIGNS

10 Interior
12 Device
14 Seat
16 Backrest
18 Seat portion
20 Seat area
22 Backrest area
24 Seat rail
26 Pivot axis
27 Floor
28 Electronic controller
30 Timer
32 Memory device
34 Memory location
36 Memory location
Z1 First state
Z2 Second state

The invention claimed is:

1. A method for operating a vehicle comprising at least one device, comprising:
   ascertaining, by the electronic computing device, a present time of day;
   determining, by the electronic computing device, that a second state of the at least one device is associated with the present time of day; and
   in response to determining that the second state is associated with the present time of day, automatically altering the at least one device from a first state to the second state,
   wherein the second state is ascertained automatically by the electronic computing device from the first state, and
   wherein the second state is associated with the present time of day based on data indicating user preference of the at least one device for the present time of day.

2. The method as claimed in claim 1, further comprising:
   before the device is automatically altered:
   storing a state of the device that a person has selected;
   ascertaining a time at which the state selected by the person is stored, wherein the ascertained present time of day at which the state selected by the person is stored is assigned to the stored state; and
   storing the assigned time
   on the basis of the assigned, stored time and on the basis of the ascertained, present time of day: using the stored state as the second state, wherein the device is automatically altered from the first state to the stored state by means of the electronic computing device.

3. The method as claimed in claim 2, wherein
the ascertained, present time of day is compared with the assigned, stored time, wherein, on the basis of the comparison, the stored state is used as the second state and the device is automatically altered from the first state to the stored state by means of the electronic computing device.

4. The method as claimed in claim 2, wherein
the device is automatically altered from the first state to the stored state by means of the electronic computing device if the ascertained, present time of day corresponds to the assigned, stored time.

5. The method as claimed in claim 2, wherein
the device is automatically altered from the first state to the stored state by the electronic computing device if the ascertained, present time of day is within a time interval ascertained on the basis of the assigned, stored time.

6. The method as claimed in claim 1, wherein
the second state is ascertained automatically by the electronic computing device from the first state on the basis of the ascertained, present time of day.

7. The method as claimed in claim 1, wherein
the device is automatically altered from the first state to the second state by the electronic computing device during a journey by the motor vehicle.

8. The method as claimed in claim 1, wherein
the first state used is a state of the device that is selected and stored by a person.

9. The method as claimed in claim 8, wherein
after the end of a journey and before the start of a journey following the end of the journey, the stored first state is selected automatically by the electronic computing device.

10. The method as claimed in claim 1, further comprising:
assigning the first state and/or the second state to a user; and
automatically selecting, by the electronic computing device the respective state of the device that is assigned to the user if it is detected that the user uses the vehicle and/or approaches the vehicle.

11. The method as claimed in claim 1, further comprising:
detecting, by the electronic computing device, a number of adjustment processes in which the device is repeatedly altered by a person from respective states to the same state or to a range of states of the device that comprises multiple states;
if the number of adjustment processes exceeds a threshold value: using the state to which the device is set in the adjustment processes as the first or second state or using a state from the range of states as the first or second state.

12. The method as claimed in claim 11, wherein
the state used as the first or second state is assigned to a primary user of the vehicle.

13. The method as claimed in claim 1, wherein
the electronic computing device ascertains a present date and automatically alters the device from the first state to the second state on the basis of the ascertained date.

14. The method as claimed in claim 1, wherein
the altering of the device results in at least one seat installation and/or a reproduction unit, designed for outputting sounds and/or images, and/or a telephone unit, designed for conducting telephone calls, and/or an air-conditioning device, designed for air-conditioning the interior of the vehicle, and/or at least one rearview mirror and/or at least one steering handle of the vehicle being altered.

15. An adjustable device for a vehicle, alterable from a first state to a second state, comprising:
an electronic computing device for controlling the adjustable device, and the electronic computing device is designed to carry out a method as claimed in claim 1.

16. The method as claimed in claim 3, wherein the device is automatically altered from the first state to the stored state by the electronic computing device if the ascertained, present time of day corresponds to the assigned, stored time.

* * * * *